(12) United States Patent
Miller et al.

(10) Patent No.: US 7,089,276 B2
(45) Date of Patent: Aug. 8, 2006

(54) MODULAR GALOIS-FIELD SUBFIELD-POWER INTEGRATED INVERTER-MULTIPLIER CIRCUIT FOR GALOIS-FIELD DIVISION OVER GF(256)

(75) Inventors: David H. Miller, Sacramento, CA (US); Richard W. Koralek, Palo Alto, CA (US)

(73) Assignee: Lockheed Martin Corp., Bethesda, MD (US)

( * ) Notice: Subject to any disclaimer, the term of this patent is extended or adjusted under 35 U.S.C. 154(b) by 712 days.

(21) Appl. No.: 10/273,002

(22) Filed: Oct. 18, 2002

(65) Prior Publication Data

US 2004/0078408 A1 Apr. 22, 2004

(51) Int. Cl.
*G06F 7/00* (2006.01)
(52) U.S. Cl. ..................................... 708/492
(58) Field of Classification Search ................. 708/492
See application file for complete search history.

(56) References Cited

U.S. PATENT DOCUMENTS

| | | | | |
|---|---|---|---|---|
| 4,975,867 A * | 12/1990 | Weng | ........................ | 708/492 |
| 5,379,243 A * | 1/1995 | Greenberger et al. | ....... | 708/492 |
| 5,467,297 A * | 11/1995 | Zook | .......................... | 708/492 |
| 5,612,910 A * | 3/1997 | Meyer | ........................ | 708/492 |
| 6,199,088 B1 * | 3/2001 | Weng et al. | ................. | 708/492 |
| 6,912,558 B1 * | 6/2005 | Morioka et al. | ............ | 708/492 |
| 2003/0192007 A1 * | 10/2003 | Miller et al. | ................. | 714/782 |
| 2004/0078747 A1 * | 4/2004 | Miller et al. | ................. | 714/782 |

* cited by examiner

*Primary Examiner*—Tan V. Mai
(74) *Attorney, Agent, or Firm*—Kenneth W. Float

(57) ABSTRACT

A modular Galois-field subfield-power integrated inverter-multiplier circuit that may be used to perform Galois-field division over GF(245). The integrated inverter-multiplier circuit combines subfield-power and parallel multiplication and inversion operations performed therein. The circuit is modular, has a relatively low gate count, and is easily pipelined because it does not use random logic. The circuit implements mathematical calculations known as "Galois-field arithmetic" that are required for a variety of digital signaling and processing applications such as Reed-Solomon and Bose-Chaudhuri-Hochquenghem (BCH) error-correction coding systems. Galois-field division is particularly difficult, typically requiring either a great deal of time or highly complex circuits, or both. The circuit uses a unique combination of subfield and power inversion techniques to carry out multiplicative inversion. Furthermore, the circuit uniquely implements Galois-field division by carrying out the multiplicative inversion and the multiplication simultaneously and in parallel. This substantially increases computation speed. The modularity and pipelineability of the present invention also make system design easier and increases the speed and reduces the gate count of an integrated circuit embodying the inverter-multiplier circuit.

13 Claims, 5 Drawing Sheets

MODULAR GALOIS-FIELD SUBFIELD-POWER INTEGRATED INVERTER-MULTIPLIER CIRCUIT FOR GALOIS-FIELD DIVISION OVER GF(256)

BACKGROUND

The present invention relates generally to error correction decoders, and more particularly, to a modular Galois-field subfield-power integrated inverter-multiplier circuit that may be used to implement Galois-field division over GF(245).

The closest previously known solutions to the problem addressed by the present invention are disclosed in U.S. Pat. No. 4,975,867 entitled "Apparatus for dividing elements of a Galois Field GF(2QM)" issued to Weng, U.S. Pat. No. 5,612,910 entitled "Circuit for inverting elements of a finite field" issued to Meyer, U.S. Pat. No. 5,467,297 entitled "Finite field inversion" issued to Zook, and U.S. Pat. No. 5,379,243 entitled "Method and apparatus for performing finite field division" issued to Greenberger et al.

U.S. Pat. No. 4,975,867 discloses an apparatus and/or method which enables one to divide two elements, A and B, of $GF(2^{2M})$, that is, perform the operation B/A, by finding the multiplicative inverse of the divisor A, and then multiplying the inverse by the numerator, B. The multiplicative inverse, $A^{-1}$, of A is found by computing a conversion factor, D, and then multiplying A by D to convert it to an element C, where C is also an element of a smaller Galois Field, $GF(2^M)$, which is a subfield of $GF(2^{2M})$. Specifically, C is equal to $A^{2M+1}$, or $A^{2M}*A$, in the field $GF(2^{2M})$. Next, the multiplicative inverse, $C^{-1}$, of C in $GF(2^M)$ is found by appropriately entering a stored look-up table containing the 2M elements of $GF(2^M)$. The multiplicative inverse, $C^{-1}$, of C is thereafter converted, by multiplying it by the conversion factor D calculated above, to the element of $GF(2^{2M})$ which is the multiplicative inverse, $A^{-1}$, of the original divisor, A. The multiplicative inverse, $A^{-1}$, of A is then multiplied by B to calculate the quotient, B/A.

U.S. Pat. No. 5,612,910 discloses a circuit for inverting a number of n bits of a finite field of 2n=N+1 elements comprises a first circuit for raising to the power t=2n/2 receiving the number to invert. A first complete multiplier receives the number to invert and the output of the circuit for raising to the power t. A second circuit provides the product of the output of the circuit for raising to the power t and the inverse of the output of the first complete multiplier.

U.S. Pat. No. 5,467,297 discloses an inversion circuit (212) determines an inverse $B^{-1}$ of an m-bit symbol B, the symbol B being expressed in a dual basis representation. Inversion circuit (212) includes an iterative convolution circuit (124A, 124B, 124C) to which the symbol B is applied and which generates and stores electrical signals corresponding to an m-bit value A. The value A is in a first basis representation and is generated by the convolution circuit such that an inner product of A and $\alpha^k B$ is equal to 0 for k<m−1. A feedback circuit (128) is provided for enabling the convolution circuit to perform a convolution with an α multiple of B. A multiplier circuit (102) is connected to the convolution circuit and generates electrical output signals corresponding to the product of the value A and $\alpha^{-r}$. The electrical output signals from the multiplier represent $A\alpha^{-r}=B^{-1}$ (i.e., the inverse of the m-bit symbol B in the first basis representation). When necessary, the m-bit value A is bit-positionally justified, either by operating the convolution circuit as a shift register or by loading the value A into a shift register (132).

U.S. Pat. No. 5,379,243 discloses an apparatus and method are provided for simplifying a finite field division, including inputs for the initial condition signals a(x), b(x), and p(x), and providing at an output node the signal c(x), where c(x)=a(x)/b(x) without intermediate inverter circuitry for finding 1/b(x). A reference register initialized to b(x), and a divider register initialized to a(x). Both registers are manipulated in parallel by a logic circuit which responds to the contents of the reference register, converting its contents to 1. By applying the same manipulations to the divider register, its contents are converted from a(x) to a(x)/b(x). One embodiment of a finite field divider according to the present invention is used to provide a single finite field division of a single set of values a(x), b(x) and p(x). Another embodiment processes continuous streams of a(x), b(x) and p(x) values, to provide a continuous stream of c(x) values delayed by a calculation time. In another embodiment, p(x) is not a stream of values, but a constant either applied to the p(x) input of the finite field divider circuit or a constant defined by fixed circuit elements within the divider circuit.

However, known prior art approaches do not combine power inversion and subfield techniques are not combined to carry out the multiplicative inverse computation. Also, known prior art approaches do not simultaneously carry out multiplicative inversion and multiplication operations in parallel using a modular structure to increase the speed with which a full division operation can be carried out. Prior art approaches do not have a modular structure that allows natural pipelining of data and provide for increased clock speed. Furthermore, prior art approaches do not have a modular structure that eases circuit design, testing and implementation. Also, prior art approaches do not provide for a circuit that is completely asynchronous.

Accordingly, it is an objective of the present invention to provide for a modular Galois-field subfield integrated inverter-multiplier circuit for use in performing Galois-field division. It is also an objective of the present invention to provide for a modular Galois-field subfield integrated inverter-multiplier circuit that may be specifically used to perform Galois-field division over GF(245).

SUMMARY OF THE INVENTION

To accomplish the above and other objectives, the present invention provides for an improved modular Galois-field subfield integrated inverter-multiplier circuit. A reduced-to-practice embodiment of the integrated inverter-multiplier circuit may be used to perform Galois-field division over GF(245). Two primary points of innovation provided by the present invention are the combined use of subfield and power inversion techniques to implement subfield-power inversion and carrying out of multiplication and multiplicative inversion in parallel.

The integrated inverter-multiplier circuit implements mathematical calculations known as "Galois-field arithmetic" that are required for a variety of digital signaling and processing applications, including, but limited to, Reed-Solomon and BCH error-correction coding systems. Galois-field division is particularly difficult, typically requiring either a great deal of time or highly complex circuits, or both. Division is usually carried out by first carrying out a multiplicative inversion followed in time by a Galois-field multiplication.

The present invention uses a unique combination of subfield and power inversion techniques to carry out multiplicative inversion. Furthermore, the present invention uniquely implements Galois-field division by carrying out the multiplicative inversion and the multiplication simultaneously and in parallel. This substantially increases the speed of the computation. The modularity and pipelineability of the present invention also make system design easier and also increases the speed and reduces the gate count of the integrated circuit embodying the inverter-multiplier circuit.

The integrated inverter-multiplier circuit is faster than conventional approaches due to combined subfield-power and parallel multiplication and inversion operations performed therein. The integrated inverter-multiplier circuit also has a lower gate count than conventional circuits. The integrated inverter-multiplier circuit is easily pipelined and is modular, in that it does not use random logic as is employed in prior art approaches.

A Galois-field division is normally a multiplicative inversion followed by a multiplication. Carrying out of the Galois-field multiplication in the present invention requires no additional time beyond that required for the multiplicative inversion alone. In effect, the multiplication takes zero time because of the way our parallelism implemented in the present invention works. The advantage of the way subfield inversion and power inversion are combined enables implementation of this multiplication in effectively zero time. This is one of the most important features of the present invention.

Furthermore, another feature of the invention is that the operation of conjugation and of multiplication are combined together into a single module that has the same gate count and time delay as multiplication alone. Thus the conjugation operation does not increase the gate count and causes no time delay.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
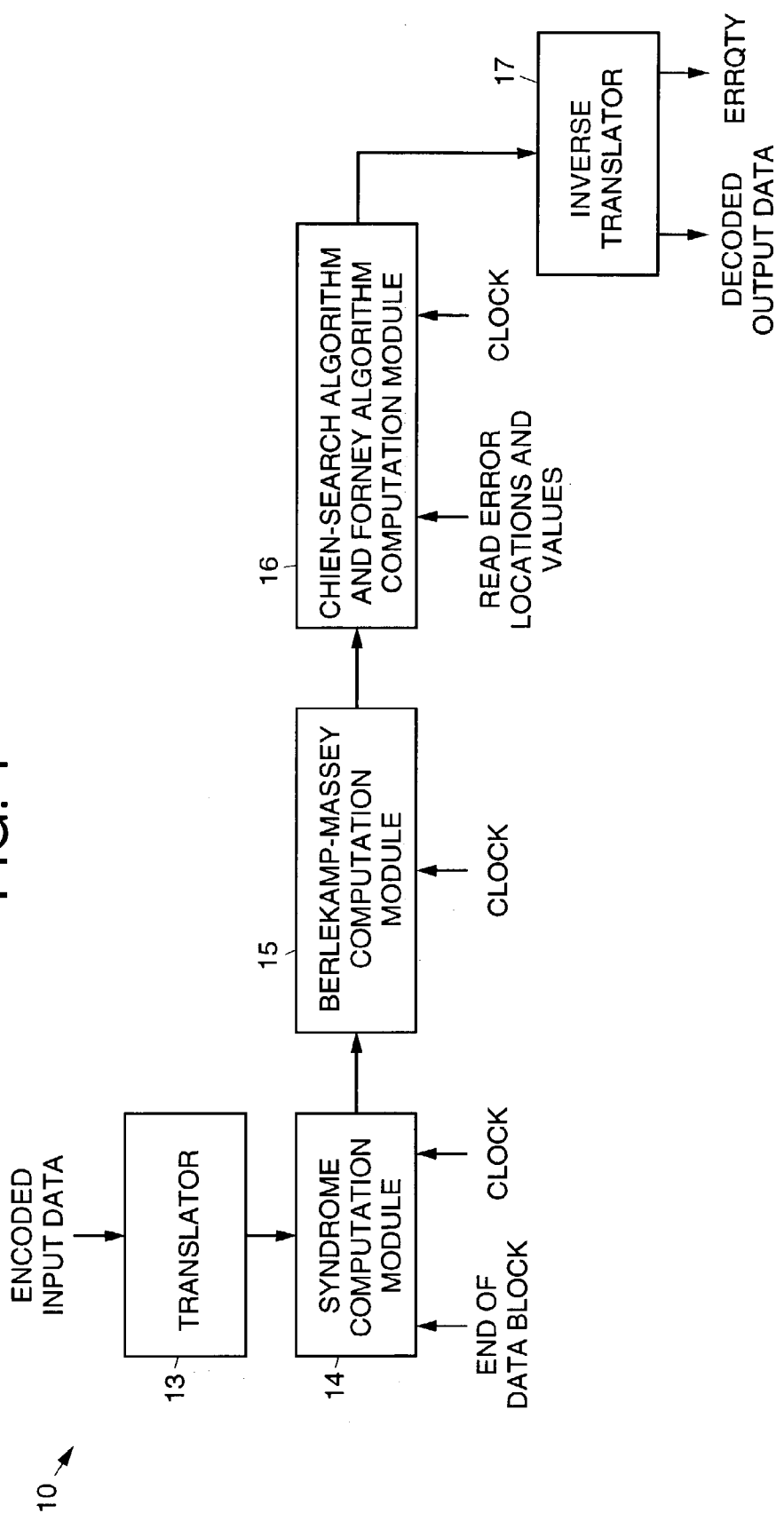
FIG. 1 is a block diagram illustrating the architecture of a programmable, systolic, Reed-Solomon BCH error correction decoder in which the present invention may be advantageously employed.

Referring to the drawing figures, FIG. 1 is a block diagram illustrating the architecture of a programmable, systolic, Reed-Solomon BCH error correction decoder 10 in which a Galois-field subfield integrated inverter-multiplier circuit 20 (FIG. 2) in accordance with the principles of the present invention may be employed.

Referring to FIG. 1, the decoder 10 includes a subfield translator 13 that processes encoded input data to perform a linear vector-space basis transformation on each byte of the data. The subfield translator 13 is coupled to a syndrome computation module 14 which performs parity checks on the transformed data and outputs $2t$ syndromes. The syndrome computation module 14 is coupled to a Berlekamp-Massey computation module 15 that implements a Galois-field processor comprising a parallel multiplier 20 and a divider circuit 40 (FIG. 4) that converts the syndromes into lambda ($\Lambda$) and omega ($\Omega$) polynomials. The Berlekamp-Massey computation module 15 is coupled to a Chien-Forney module 16 that calculates error locations and error values from the polynomials and outputs them. An inverse translator 17 performs an inverse linear vector-space basis transformation on each byte of the calculated error values.

Figure 2:
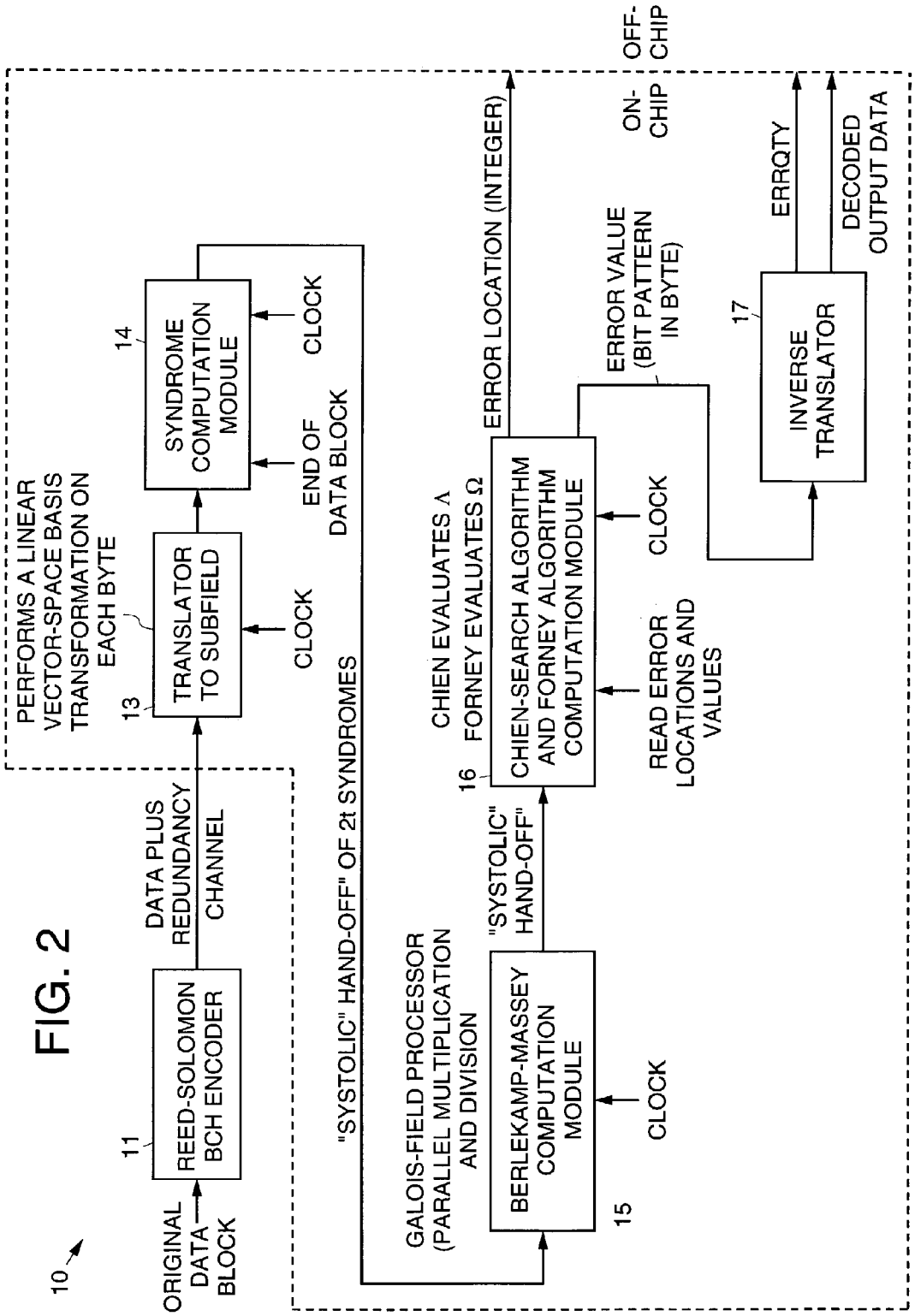
FIG. 2 is a more detailed diagram of the decoder shown in FIG. 1.

Referring to FIG. 2, an original data block is encoded by a Reed-Solomon BCH encoder 11, not part of the current invention, which outputs data over a channel to a Reed-Solomon decoder 10 which decodes the Reed-Solomon encoding. The subfield translator 13 performs a linear vector-space basis transformation on each byte of the data. The syndrome computation module 14 performs parity checks on the transformed data and outputs syndromes. The Berlekamp-Massey computation module 15 (Galois-field processor) converts the syndromes into lambda ($\Lambda$) and omega ($\Omega$) polynomials. The Chien-Forney module 16 uses a Chien algorithm to calculate error locations and error values from the polynomials and outputs them. The Chien algorithm evaluates the lambda ($\Lambda$) polynomials while the Forney algorithm uses both the lambda ($\Lambda$) and the omega ($\Omega$) polynomials to calculate the actual bit pattern within a byte that corresponds to the error value. The inverse translator 17 performs an inverse transform on each byte of the calculated error values to translate between the internal chip Galois-field representation and the external representation that is output from the decoder 10.

Thus, the error correction decoder 10 comprises three basic modules, including the syndrome computation module 14, the Berlekamp-Massey computation module 15, and the Chien-Forney module 16. The syndrome computation module 14 calculates quantities known as "syndromes" which are intermediate values required to find error locations and values. The Berlekamp-Massey computation module 15 implements a Berlekamp-Massey algorithm that converts the syndromes to other intermediate results known as lambda ($\Lambda$) and omega ($\Omega$) polynomials. The Chien-Forney module 16 uses modified Chien-search and Forney algorithms to calculate the actual error locations and error values.

The error correction decoder 10 is implemented as a high-speed integrated circuit capable of error-detection and error-correction in digital data transmission and storage applications including, but not limited to, microwave satellite communications systems. Use of error correction technology reduces the power and/or bandwidth required to support a specified error-rate performance under given operating conditions in data transmission systems: in data storage systems, error correction technology makes possible higher storage densities.

A reduced-to-practice embodiment of the error correction decoder 10 has been designed to decode six different Reed-Solomon codes and four different BCH codes. Reed-Solomon and BCH codes are "block codes" which means that the data is, for error-correction purposes, processed in blocks of a given maximum size. In the encoder 11, each block of data has a number of redundancy symbols appended to it. The present decoder 10 processes the total block (data and redundancy symbols) and attempts to detect and correct errors in the block. These errors can arise from a variety of sources depending on the application and on the transmission or storage medium.

In standard notation, the Reed-Solomon codes that can be decoded by the present decoder 10 are: (255, 245) t=5, (255, 239) t=8, (255, 235) t=10, (255, 231) t=12, (255, 229) t=13, and (255, 223) t=16. Here, as is well-known in the field, "t" is the number of errors the code is guaranteed to be capable of correcting within a single block of data-plus-redundancy. Standard (n, k) notation is used to denote the code, where n is the number of symbols of data plus redundancy in one code block and k is the number of symbols of data alone. Therefore, the (255, 245) code has 245 symbols of data and 10 additional redundancy symbols. For all six of these particular Reed-Solomon codes, a single symbol is one byte (i.e., eight bits).

For Reed-Solomon codes, a symbol is treated both in mathematical analysis and physically by the decoder (chip) 10 as a single unit, and hence the decoder 10 processes Reed-Solomon data byte-wide. The BCH codes that the decoder 10 can decode are: (255, 231) (255, 230), (255, 223), and (255, 171), again using the (n, k) notation. For BCH codes, a symbol includes one bit. This specific choice of codes is unique to the decoder 10.

In an alternative implementation which involves only minor changes to input and control registers, the decoder 10 is capable of decoding Reed-Solomon codes with all t-values up to t=16 and BCH codes with all t-values up to t=11. These changes include a chip programming interface, because t values are loaded into the decoder 10, a grand loop counter in the Berlekamp-Massey module 15, and changes to steering circuitry that selects which syndromes to use. Further changes to the syndrome module 14 (adding additional exclusive-OR trees) extend the capability to decode BCH codes up to t=16.

The decoder 10 can switch "on-the-fly" during operation, between different codes, which is a significant feature of the invention. To enable immediately succeeding code words to be from different codes, a configuration word is loaded for each code word, and that configuration word follows the code word from the syndrome module 14 to the Berlekamp-Massey module 15 and onward to the Chien-Forney module 16. This aspect of the decoder 10 is a separate and distinct feature compared to the ability of the decoder 10 to switch between codes of different degrees of shortening on the fly.

The reduced-to-practice embodiment of the decoder 10 was implemented in a CMOS gate array. However, it is completely straightforward to implement the decoder 10 using any standard semiconductor technology, including, but not limited to, gallium arsenide gate arrays, or gallium arsenide custom chips.

Using the (n, k) notation, an (n, k) code, whether Reed-Solomon or BCH, can easily be used as an (n−i, k−i) code for any positive i less than k. The decoder 10 may be used in this way to handle such "shortened" codes. Control signals are used so that the value of i can be adjusted on the fly without any delay between data blocks that have been shortened by different amounts. The only constraint is that there must be enough time for the decoder 10 to process one data block before receiving the next block.

Specifically, the block length is controlled by a signal bit that goes high when the first byte arrives and goes low at the last byte. An internal counter (not shown) counts the number of bytes, and the falling edge of this signal indicates that the block is complete and the byte counter now contains the block length. The ability to use shortened codes and to switch on the fly between shortened codes of different degrees of shortening is a separate and independent feature of the decoder 10, which is different from the ability to switch between codes of different t values. This is a significant and useful feature of the decoder 10.

As mentioned above, the decoder 10 is divided into three basic modules. The syndrome module 14 calculates syndromes which are intermediate values required to find error locations and values. The Berlekamp-Massey module 15 implements an algorithm universally known as a Berlekamp-Massey algorithm that converts the syndromes to other intermediate results known as lambda and omega polynomials. The Chien-Forney module 16 uses modified Chien-search and Forney algorithms to calculate actual error locations and error values.

The speed of the clock of each of these three modules 14, 15, 16 can be independently controlled separately from the other two modules, and there is no required phase relationship among the clocks for the different modules 14, 15, 16. Thus, the clocks for the separate modules 14, 15, 16 can be free-running (the clocks for the different modules 14, 15, 16 may also be tied together if desired). This allows optimum speed and performance for the decoder 10 and flexibility. This is a significant feature of the decoder 10. The clocks for the different modules 14, 15, 16 may also be tied together off-chip if desired.

Furthermore, while an off-chip signal tells the syndrome module 14 that the end of a data block has occurred and off-chip signals tell the Chien-Forney module 16 to read out error locations and values, all timing of data transfer and transfer of control among the three modules 14, 15, 16 is asynchronously controlled internally on-chip without any control from off-chip circuits.

Because the time required for each module to complete its task is variable, depending on number of errors, degree of shortening, etc., and because these factors commonly do differ between one block of data and the immediately following block, and because the clocks for different modules can run independently which alters the actual elapsed time required for each module 14, 15, 16 to perform its task, this flexible internal control of transfers between modules is very important and can greatly ease the use of the decoder 10 in applications.

This feature of the decoder 10 is separate and distinct from the feature which allows separate asynchronous clocks for the different modules 14, 15, 16. That is to say, the decoder 10 may use on-chip data flow but not use separate free-running clocks, or vice versa. This asynchronous-internally-controlled transfer of data and control among the modules 14, 15, 16 is a desirable feature of the present invention.

To carry out the mathematical calculations involved in decoding Reed-Solomon and BCH error-correction codes, mathematical structures known as "Galois fields" are employed. For a given-size symbol, there are a number of mathematically-isomorphic but calculationally distinct Galois fields. Specification of a Reed-Solomon code requires choosing not only values for n and k (in the (n, k) notation) but also choosing a Galois-field representation. Two Reed-Solomon codes with the same n and k values but different Galois-field representations are incompatible in the following sense: the same block of data will have different redundancy symbols in the different representations, and a circuit that decodes a Reed-Solomon code in one representation generally cannot decode a code using another Galois-field representation. This is not true for BCH codes.

From the viewpoint of a Reed-Solomon decoder 10, the Galois-field representation is commonly given by external constraints set in an encoder 11 in a transmitter for data transmission applications or in an encoder 11 in a write circuit for data storage applications. This normally precludes choosing a representation that will optimize the operations required internally in the decoder 10 to find the errors.

In the decoder 10, the externally given Galois-field representation is not in fact optimal for internal integrated circuit operations. Therefore, a different Galois-field representation is used on-chip than is used external to the chip. An internal representation was chosen by computer analysis to maximize global chip speed and, subject to speed maximization, to minimize global chip gate count. The translator circuit 13 is used at the front end of the decoder 10 and the inverse translator circuit 17 is used at the back end to translate between the internal chip Galois-field representation and the external representation.

The internal Galois-field representation is a "quadratic subfield" representation. Galois fields are finite mathematical structures that obey all of the normal algebraic rules obeyed by ordinary real numbers but with different addition and multiplication tables: these mathematical structures have numerous uses including error correction and detection technology.

Just as there are a number of different ways of representing ordinary numbers (decimal numbers, binary notation, Roman numerals, etc.), so also there are an infinite number of different ways of representing Galois fields. The most common technique represents elements of a Galois field by means of a so-called field-generator polynomial (not to be confused with the code-generator polynomial). The corresponding notation represents elements of the field by using the root of this field-generator polynomial as a base for the Galois-field number system, much as the number 10 is the base of the decimal system or the number 2 serves as the base of the binary system (in the case of Galois fields, this base element also serves as a natural base for integer-valued logarithms, which is not the case for ordinary numbers).

However, it has been known to mathematicians for over a century that there are other techniques for representing the elements of Galois fields. For example, the normal way of representing complex numbers uses ordered pairs of real numbers: since the real numbers are a complete field mathematically in and of themselves, the complex numbers are referred to as a field extension of the real numbers and the real numbers are referred to as a subfield of the complex numbers. The two components of a complex number differ by a factor of the square root of minus one, and in a sense this factor serves as a base element for the complex numbers over the real numbers. The real numbers can then still be placed in whatever representation one chooses (decimal, binary, etc.), so, in a sense, one has a double choice of field bases—first for the real numbers themselves and then to go from the real to the complex numbers.

The same technique works for many Galois fields. The smaller Galois field that plays the same role as the real numbers is the subfield. If the element that takes one from the subfield to the whole field (i.e., the square root of minus one for complex numbers) satisfies a quadratic equation with coefficients in the subfield, is referred to as a "quadratic subfield". Real numbers are, in fact, a quadratic subfield of the complex numbers.

When a field is represented in a quadratic subfield representation, it always takes an ordered pair of subfield elements to represent an element of the whole field, just as an ordered pair of real numbers represents a single complex number. The processes of addition, multiplication, and division in Galois-field subfield representations are very similar to the same processes carried out in the usual ordered-pair representation of complex numbers.

All of this is classical mathematics more than a century old. Quadratic-subfield representations are not therefore in and of themselves a novelty. The novelty in the present invention lies rather in the invention of novel and greatly improved Galois-field multipliers 20 and divider circuits 40 that are made possible by the use of a quadratic-subfield representation on-chip. These novel and powerful circuits, described in more detail below, work in the quadratic-subfield representation.

Given that the data coming into the decoder (chip) 10 are, in general, not in a quadratic-subfield representation (because this is generally not the preferred implementation for error-correction encoders), the advantages gained by using a quadratic-subfield representation on-chip are realized if the translator and inverse translator circuits 13, 17 are employed for incoming and outgoing data, respectively, to translate in and out of the subfield representation. Use of such translator and inverse translator circuits 13, 17 has the additional advantage that the decoder 10 can easily be modified at the gate-array level or, in an alternative implementation, programmed on-chip so as to accept data encoded in any standard field representation. This level of flexibility is an added benefit not available in conventional error-correction decoders.

An important feature of the decoder 10 is, therefore, that, by changing the translator and inverse-translator circuits 13, 17 at a gate-array level, all standard Galois-field representations can be processed for the external data and redundancy with no change of any sort in the chip except for the changes in the translator and inverse translator circuits 13, 17. This is in no way restricted to standard polynomial or subfield representations, but includes any representation that is linearly related to the standard representations, which includes but is not limited to all standard polynomial and subfield representations. The term "linearly" refers to the fact that a standard representation can be considered to be a vector space over the Galois field known as GF(2). This includes all currently used representations. This dramatically expands the number of systems in which the decoder 10 may be used. An alternative and straightforward implementation of the decoder 10 includes programmable translator and inverse-translator circuits 13, 17 internally on-the-fly on the chip rather than at the gate-array level. There are several well-known ways to do this.

The Berlekamp-Massey module 15 carries out repeated dot product calculations between vectors with up to seventeen components using Galois-field arithmetic. The usual textbook method of doing this is to have a single multiplication circuit as part of a Galois-field arithmetic logic unit (GFALU). Instead, in the decoder 10, seventeen parallel multipliers implemented in the Berlekamp-Massey module 15 are used to carry out the dot product in one step. This massive parallelism significantly increases speed, and is made feasible because of the optimizing choice of an internal quadratic-subfield Galois-field representation that is different from the representation used off-chip. The parallel multiplier circuit 20 operating in an internal quadratic-subfield Galois-field representation is a novel feature of the present invention.

The massively parallel multiplier structure in the Berlekamp-Massey module is independent of the subfield field representation. This architecture of the Berlekamp-Massey module which uses a relatively large number of multipliers 20 in parallel, may also be used with a decoder using conventional field representation and conventional textbook Galois Field multipliers.

Both the Berlekamp-Massey Galois-field ALU in the Berlekamp-Massey module 15 and the Forney algorithm section of the Chien-Forney module 16 require a circuit that rapidly carries out Galois-field division. The decoder 10 implements a novel power-subfield integrated Galois-field divider circuit 40 (FIG. 6) to perform this function which combines subfield and power methods of multiplicative inversion. The power-subfield Galois-field divider circuit 40 may be used in a wide variety of applications not limited to this chip or to Reed-Solomon and BCH codes, such as in algebraic-geometric coding systems, for example.

In the course of carrying out the Berlekamp-Massey algorithm, the Berlekamp-Massey module repeatedly computes dot products of two vectors stored in two shift registers. Often the multiplier or multiplicand is zero. To carry out the multiplication in such a case wastes substantial time since multiplication is much slower than shifting the shift register. By avoiding zero multiplies, substantial time is saved.

There are several ways to do this. First, for a given code, parts of the shift register are always zero. Second, for a given code, at any particular point in the calculation, mathematically, some stages in the shift register will be zero. Finally, some coefficients may be fortuitously zero. A zero detect can be performed to avoid multiplication whenever it would be a zero multiply (in general, the lambda register is more likely zero compared to the syndrome register) or counters can set up to avoid zero multiplies when the counter indicates that a shift register entry must be zero.

Repeated multiplies are carried out in the Berlekamp-Massey module 15, and in particular, the Galois-field ALU. For maximum speed of chip operation, it is necessary that a large number (17 in the disclosed embodiment) of multiplications be repeatedly carried out in parallel all at once. This can be done by use of a massive bank of parallel multipliers 20 (seventeen parallel multipliers 20 in the disclosed embodiment). Both the speed and the size of these multipliers 20 is important because of the large number that are present.

There are several methods by which these Galois-field multiplications may be done. A random-logic multiply operation using the off-chip Galois field representation may be performed, which is relatively straightforward but requires a relatively large circuit. As an alternative, standard log and antilog tables may be employed, especially in a CMOS decoder 10. This approach requires separate log and antilog tables (each 256 by one byte for 255 codes). This approach also requires a mod 255 binary adder. Subfield log and antilog tables may be used, which requires much smaller (by about a factor of eight) tables. However, this approach requires complicated additional circuits to take the subfield results and make use of them for the full field in comparison to a full-field log/antilog-table approach.

Subfield log and antilog tables may be used, which requires much smaller (by about a factor of eight for the 255 codes) tables. However, this approach uses translation circuits at the input and output of the multiplier to go back and forth from the standard to the subfield representation. It is also necessary to perform a subfield divide (and to have control circuitry for the divide-by-zero case) and to do two extra binary additions. This approach is slower than the log/antilog approach but requires less circuitry.

It is also possible to perform a direct multiply in the subfield without using log/antilog look-up tables. If translation in and out of the subfield is not required, this approach has a significantly lower gate count than a full-field random-logic multiply and a slightly higher speed. However, if translation into and out of the subfield for each multiply are required, this approach results in negligible savings. This is one of the reasons that it is highly advantageous to use a quadratic-subfield representation on chip, even though this representation is different from the representation used for the incoming data.

Dividing may be accomplished using a staged divider. In the case of 255 codes, four random-logic multipliers (or subfield multipliers) are combined and small parity trees are used to generate the multiplicative inverse. To carry out a divide using this approach, the inverse is found and then a multiply is performed.

However, in the Berlekamp-Massey module 15, divides are carried out very rarely, so that the speed is not that relevant. Also, four multipliers may be used in parallel for standard multiply operations, so that the gate count is not affected.

Standard log/antilog tables may be used as in the multiplicative case. A binary subtractor mod 255 may be used to directly perform division or the log of the multiplicative inverse (which means just 1's complementing the logarithm) and then add logs to multiply.

Subfield log/antilog tables may be used as in the multiplicative case. Subfield division has substantial advantages over a staged divider in terms of speed and size, even including the translation circuits between subfield and standard representations.

Standard textbook algorithms require a separate calculation of a quantity known as the "formal derivative of the lambda polynomial". This separate calculation is avoided by absorbing it into the Chien search algorithm. The syndrome calculation circuits, including the parity trees, are re-used for the Chien search.

Figure 3:
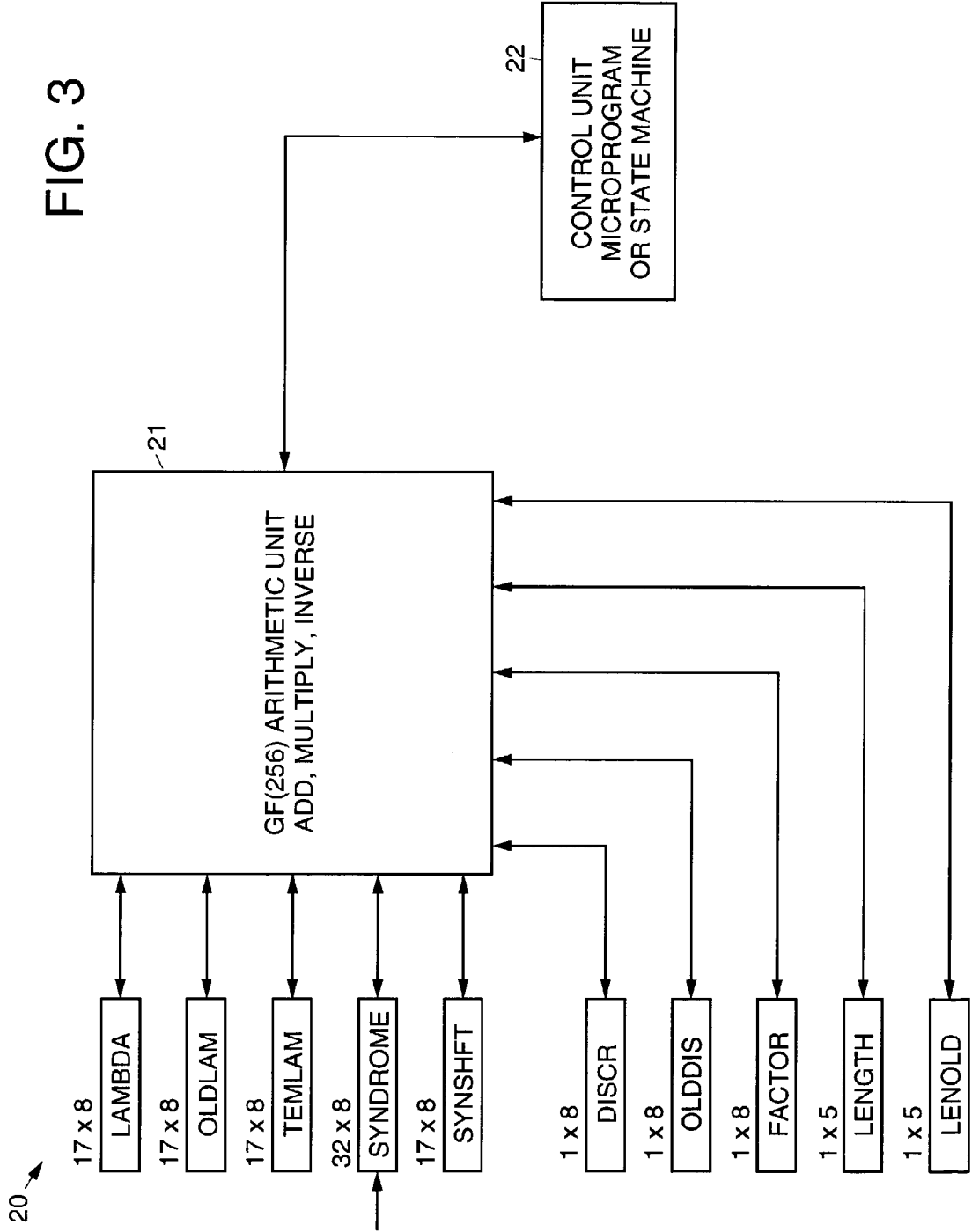
FIG. 3 is a block diagram illustrating the architecture of an exemplary modular Galois-field subfield integrated inverter-multiplier circuit in accordance with the principles of the present invention, which may be used in the decoder of FIG. 1.

FIG. 3 is a block diagram illustrating the architecture of an exemplary modular Galois-field subfield integrated inverter-multiplier circuit 20 in accordance with the principles of the present invention. The modular Galois-field subfield integrated inverter-multiplier circuit 20 may be advantageously used in the decoder 10 shown in FIG. 1

A preferred embodiment of the integrated inverter-multiplier circuit 20 is embodied in an integrated circuit. The integrated inverter-multiplier circuit 20 implements division using subfield and power methods of multiplicative inversion. The power-subfield Galois-field divider circuit may be used in a wide variety of applications not limited to a particular integrated circuit chip or to Reed-Solomon and BCH codes, such as in algebraic-geometric coding systems, for example.

The inverter-multiplier circuit 20 comprises a Galois field divider and will be discussed in conjunction with the Berlekamp-Massey algorithm. The output of the divider is the actual error pattern, which is bit-by-bit XORed with a received byte to correct it. Registers are provided to store the error byte values as they are found.

The Berlekamp-Massey algorithm is an iterative algorithm that uses algebra over the Galois field mathematical structure. A module 15, referred to as the Berlekamp-Massey module 15, that performs this algorithm is essentially a microprogrammed Galois field (GF) arithmetic unit. A block diagram of this module 15 is shown in FIG. 3. The present integrated inverter-multiplier circuit is employed in this module 15.

The Berlekamp-Massey module 15 comprises a GF(256) arithmetic unit 21 coupled to a controller 22. The controller 22 may be a microprogram or a state machine, for example. The GF(256) arithmetic unit 21 has various registers coupled to it whose functions are as follows.

The registers shown in FIG. 3 are essentially scratchpad registers that store interim results during the Berlekamp-Massey algorithm. LAMBDA contains the running estimate of the error locator polynomial LAMBDA and, later in the algorithm, the running estimate of the error evaluator polynomial OMEGA. OLDLAM contains the estimate of LAMBDA from the previous iteration of the algorithm. TEMLAM is a temporary storage register for intermediate estimates of LAMBDA during the algorithm. SYNDROME contains the syndromes, initially loaded from the syndrome module. SYNSHFT is a shift register that rotates the syndromes for different iterations of the algorithm. DISCR contains the "discrepancy" that is computed at each iteration of the algorithm. OLDDIS contains the value of the "discrepancy" from the previous iteration of the algorithm. FACTOR stored the value of DISCR divided by OLDDIS, which is used to modify the updates to LAMBDA. LENGTH stores the length of LAMBDA, which represents the number of errors plus 1, and LENOLD is the length of LAMBDA from the previous iteration of the algorithm.

The mathematical operations performed by the GF(256) arithmetic unit 21 used in the Berlekamp-Massey module 15 over a Galois field include addition, multiplication, and division. Subtraction is the same as addition over a field of characteristic 2. Addition is simply a bit-by-bit exclusive-OR operation. Multiplication can be modeled as the multiplication of two polynomials modulo another polynomial, resulting in a set of equations similar to the matrices in the encoder 11. Division is accomplished by multiplying by the multiplicative inverse of the divisor; computing the inverse of an element will be described below.

In a reduced-to-practice embodiment, multiplication and division are performed using gate-level circuits. If a quadratic-subfield representation were not used on the chip, the logic equations for a multiplier over GF(256) would be as follows (c(0:7) is the Galois field product of a(0:7) times b(0:7); "*" represents an AND operation; "+" represents an exclusive-OR operation; and c8 through c14 are intermediate quantities used to calculate the final answer):

$c0=[(a0*b0+c14)+(c12+c13)]+c8$ $c1=[(a0*b1+a1*b0)+(c13+c14)]+c9$ $c2=[(a0*b2+a1*b1+a2*b0)+(c12+c13)]+[c8c10]$ $c3=[(a0*b3+a1*b2+a2*b1+a3*b0)+(c11+c12)+[c8c9]$ $c4=[(a0*b4+a1*b3+a2*b2+a3*b1+a4*b0+c14)+c8]+[c9c10]$ $c5=[(a0*b5+a1*b4+a2*b3+a3*b2a4*b1+a5*b0)+c11]+[c9+c10]$ $c6=[a0*b6+a1*b5+a2*b4+a3*b3+a4*b2+a5*b1+a6*b0]+[c10+(c11+c12)]$ $c7=[a0*b7+a1*b6+a2*b5+a3*b4+a4*b3+a5*b2+a6*b1+a7*b0]+[(c11+c12)+c13]$ $c8=a1*b7+a2*b6+a3*b5+a4*b4+a5*b3+a6*b2+a7*b1$ $c9=a2*b7+a3*b6+a4*b5+a5*b4+a6*b3+a7*b2$ $c10=a3*b7+a4*b6+a5*b5+a6*b4+a7*b3$ $c11=a4*b7+a5*b6+a6*b5+a7*b4$ $c12=a5*b7+a6*b6+a7*b5$ $c13=a6*b7+a7*b6$ $c14=a7*b7$

The straightforward circuit implementation of this set of logic equations comprises 64 AND gates and 77 XOR gates. While automated circuit optimization techniques can reduce this count slightly, the circuit size is still unacceptably large, especially for low-density technologies such as gallium arsenide, given that one requires a large number of these multipliers in parallel for a high-speed implementation of the Berlekamp-Massey module 15.

The solution to this problem embodied in the present invention is to use a quadratic-subfield modular multiplier circuit which is just as fast as the straightforward circuit just described but which has a significantly lower gate count. This quadratic-subfield modular multiplier circuit is used when the on-chip Galois-field representation is a quadratic-subfield representation. This is one of the major advantages of using on-chip a quadratic-subfield representation which differs from the Galois-field representation used off-chip.

A key component of the quadratic-subfield modular multiplier circuit is a subfield-multiplier module which multiplies two nybbles in the Galois subfield GF(16) to produce an output nybble as the product. The logic equations for the subfield-multiplier module of the quadratic-subfield modular multiplier circuit are as follows, and wherein, c(0:4) is the Galois field product of a(0:4) times b(0:4); "*" represents an AND operation; "+" represents an exclusive-OR operation; and c4 through c6 are intermediate quantities used to calculate the final answer:

$c0=a0*b0+c4$ $c1=[(a0*b1+a1*b0)+c5]+c4$ $c2=[a0*b2+a1*b1+a2*b0+c6]+c5$ $c3=a0*b3+a1*b2+a2*b1+a3*b0+c6$ $c4=a1*b3+a2*b2+a3*b1$ $c5=a2*b3+a3*b2$ $c6=a3*b3$

The subfield-multiplier module deals only with nybbles as input and output rather than with whole bytes. The primary advantage of the quadratic-subfield representation is that it makes possible this sort of breaking up of bytes into nybbles, so that the nybbles can be processed separately and in parallel. This advantage is even more telling in the case of Galois-field division.

The quadratic-subfield modular multiplier circuit also requires a simple "epsilon-multiply" module ("+" is as before; input is the nybble s(0:3), and output is the nybble t(0:3)):

$t0 = s0 + s1$ $t1 = s2$ $t2 = s3$ $t3 = s0$.

The detailed logic equations for the subfield multiplier module and for the epsilon-multiply module depend in detail on the specifically chosen quadratic-subfield representation. However, the way that these modules fit together to form the full quadratic-subfield modular multiplier circuit does not depend on the quadratic subfield chosen. Then, the full quadratic-subfield modular multiplier circuit is constructed as:

$c1 = (a+a0)*(b1+b0) + b1*b0$ $c0 = b1*b0 + \text{EPSILON\_MULTIPLY}(a1*a0)$ where "*" now refers to nybble-wide multiplication using the subfield-multiplier module and where "+" now refers to bit-wise exclusive-ORing of two nybbles (i.e., "+" represents four parallel exclusive-OR gates).

The gate count for the whole quadratic-subfield modular multiplier circuit is then 62 XOR gates and 48 AND gates, significantly lower than for the standard multiplier module described above which would be employed were a quadratic-subfield representation not used. As for the standard multiplier module), logic-optimization software might reduce this gate count slightly in various implementations. This physically smaller size (and correspondingly lower power consumption) of the quadratic-subfield modular multiplier circuit )) makes feasible a larger number of parallel multipliers for the Berlekamp-Massey module 15.

The other arithmetic operation required, in both the Berlekamp-Massey module 15 and the Chien-Forney module 16, is division. Division is the most difficult arithmetic operation to carry out over a Galois field, generally requiring a significantly more complicated implementation than a Galois-field multiplier. There are several generally-known methods to carry out division in a Galois field.

One method is to use standard log/antilog tables, as in the multiplicative case, to carry out division: as in the case of multiplication, the size and speed of the needed ROMs can be a significant problem, especially in high-speed but low-density technologies such as gallium arsenide. A binary subtractor mod 255 is also required to perform division with this method.

A variant on this method also includes a separate table to look up the logarithm of the multiplicative inverse of the divisor rather than the divisor itself. This allows the use of a binary adder mod 255 rather than a binary mod 255 subtractor; however, the cost is a full additional ROM array. Another variant would have a separate table to directly look up the multiplicative inverse of the divisor: this could then be used as one input to any sort of Galois-field multiplier, the other input being the dividend; again, the price here is a full additional ROM.

Subfield log/antilog tables may also be used as in the multiplicative case. Again, this requires much smaller tables but a great deal of additional circuitry to go from the subfield computations to the final result for the whole full field.

The use of a table look-up technique would involve (for GF(256)) two full 64 K ROMs which store the entire full-field multiplication and division tables. However, this is very costly in terms of circuit size, especially in high-speed low-density technologies.

In these various table look-up techniques, one notes that some of the techniques require first finding the multiplicative inverse and then multiplying by the inverse, while others do not need to find the multiplicative inverse as an intermediate step. However, generally-known non-table look-up technologies for doing Galois-field division do in general require first finding the multiplicative inverse of the divisor and then, secondly, multiplying by the dividend to obtain the quotient. This two-stage approach imposes serious costs in terms of speed since one must first carry out the time-consuming process of finding a multiplicative inverse before carrying out the additional task of a Galois-field multiplication.

Figure 4:
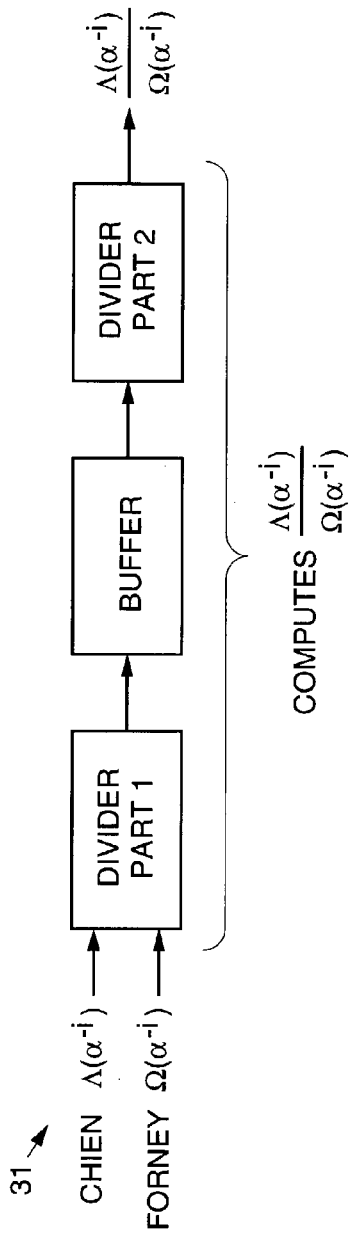
FIG. 4 is a block diagram showing a divider circuit used in the inverter-multiplier circuit of FIG. 3.

A basic example of a Galois-field multiplicative-inversion module 31 that may be used in such a two-stage Galois-field divider circuit 40 is shown in FIG. 4. This power-inversion module 31 makes use of two mathematical facts about Galois fields.

First, in any Galois field with N elements, if one takes any non-zero element to the (N−2) power one gets the multiplicative inverse of the element in question. While interesting, this would naively require (N−3) multiplications, which are extremely time-consuming. However, rather than doing these (N−3) multiplications in sequence, one can make use of the basic property of exponentials that any quantity to the power pq can be calculated by first taking the exponential to the power p and then taking the result to the power q. That is, to take the fourth power of an element, one can multiply the element by itself and then take the answer and multiply it by itself again, thereby requiring only two multiplications instead of three.

This technique allows one to reduce the number of operations to far less than (N−3) multiplies in order to get the multiplicative inverse. However, the number of multiplications required can still be substantial.

The second useful mathematical fact holds only for Galois fields for which the number of elements is a power of two-so-called fields of characteristic two, which happens to include GF(256) and most Galois fields used in practical error-correction applications. This fact is that the operation of taking any field element to a power which is itself a power of two (i.e., square, fourth power, eighth power, etc.) can be implemented by a very small and simple XOR tree without carrying out any Galois-field multiplications at all. This fact allows one to easily carry out a limited number of particular exponentiation operations which can then be used as building blocks to take the (N-2) power needed to find the multiplicative inverse.

There are a number of power-inversion Galois-field multiplicative inversion modules 31 that may be straightforwardly designed based on these two principles. FIG. 4 shows a simple example for GF(256). This power-inversion module 31 requires four separate full-field Galois-field multipliers 32, as well as several power-of-two exponentiation modules 33 connected as shown in FIG. 4 (the power-of-two exponentiation modules 32 are very small exclusive-OR trees; nearly all of the gate count is in the four multipliers 32). In addition, another multiplier is required to carry out the final multiplication with the dividend.

Of course, if one re-used one or more of the multipliers 32, one could have fewer than four multipliers 32. However, this can become quite complicated in terms of control circuitry, data flow, and timing.

The gate count for a Galois-field divider circuit 40 using the power-inversion module 31 presented in FIG. 4 and an additional multiplier 32 to multiply by the dividend, if everything is done in a standard (non-subfield) Galois-field representation using standard non-subfield multipliers, is 438 XOR gates and 320 AND gates. The gate delay is 31 XOR gate delays and 5 AND gate delays. This is very big and very slow.

Figure 5:
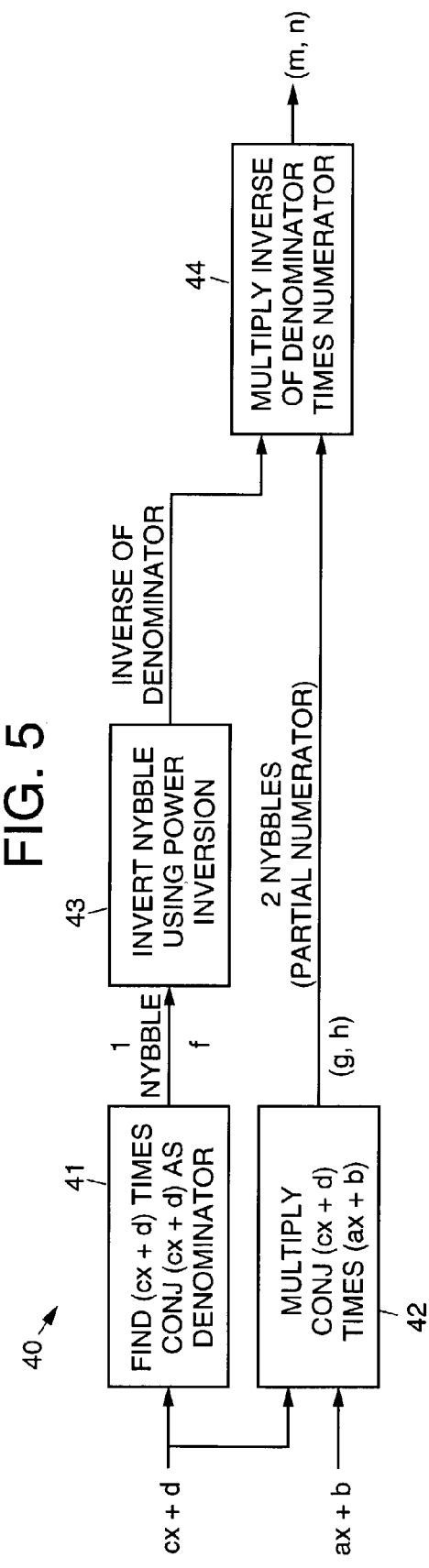
FIG. 5 is a block diagram showing a multiplicative inversion circuit used in the inverter-multiplier circuit of FIG. 3.

The multiplicative inversion arithmetic operation is a difficult one, and can be optimally performed by the circuit shown in FIG. 5. FIG. 5 is a block diagram showing the Galois-field divider circuit 40 implemented in accordance with the present invention that may be used in the inverter-multiplier circuit 20 shown in FIG. 3. The Galois-field divider circuit 40 comprises a nybble denominator circuit 41 that generates or computes a nybble denominator. A conjugate multiplier circuit 42 is that generates or computes a nybble numerator. A nybble power inversion circuit 43 inverts the nybble denominator using power inversion in accordance with the present invention. Finally, a multiplier circuit 44 multiplies the inverse of the nybble denominator by the nybble numerator to complete the multiplicative inversion arithmetic operation.

The most important feature of the Galois-field divider circuit 40 shown in FIG. 5 is its combined use of subfield and power inversion computations to find the multiplicative inverse. A preferred design carries out the multiplication and multiplicative inversion operations in parallel to give a dramatic improvement in speed. It also gives significant improvements in gate count over more obvious divider designs, and it is easily pipelineable. The discussion herein details the design for a specific Galois field and subfield representation that may be used on the chip. However, the technique may be used for a wide variety of Galois fields in quadratic subfield representations.

The divider circuit 40 (inversion circuit), if implemented entirely in hardwired logic, contains four power circuits and four multiplies. The power circuits are very simple XOR-trees. In the reduced-to-practice embodiment, operations are performed by a sequence of microprogram steps in the Galois field ALU, so the only effect on the Galois field ALU is the addition of three power matrices and the appropriate control circuitry.

In the present invention, a novel method of performing Galois-field division is implemented by the Galois-field divider circuit 40, which comprises a subfield-power integrated Galois-field divider circuit 40. This circuit 40 does not use table look-up, and it is not necessary to carry out a multiplicative inversion before multiplying by the dividend. The gate count for a reduced-to-practice embodiment of the divider circuit 40 is 144 AND gates and 173 XOR gates. The total gate delay is 3 AND gate delays and 11 XOR gate delays, which is more than twice as fast and less than half the size of the previously described divider shown in FIG. 4.

Figure 6:
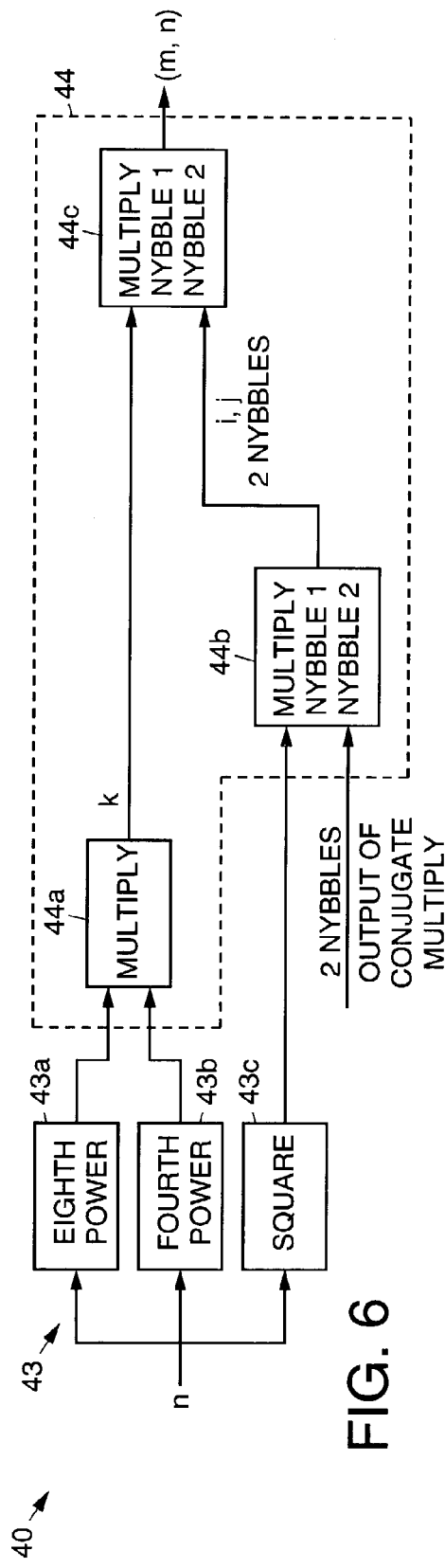
FIG. 6 is a block diagram showing implementation details of the nybble power inversion circuit used in the subfield-power integrated Galois-field divider circuit that invert a single nybble within a subfield.

Implementation details of the nybble power inversion circuit 43 used in the subfield-power integrated Galois-field divider circuit 40 of FIG. 5 is shown in FIG. 6. Just as the use of a quadratic-subfield representation allows creation of a quadratic-subfield modular multiplier that handles the two nybbles of a single byte as separate quantities that can be operated on in parallel, so also the subfield-power integrated divider circuit 40 processes nybbles separately. Most of the implemented circuit includes the same subfield multiply modules (or slight variations thereof) used in the quadratic-subfield modular multiplier as described above.

One key feature of the subfield-power integrated divider circuit 40 is the use of power-inversion methods to invert a single nybble within the subfield. As is shown in FIG. 6, this involves the square, fourth power, and eighth power modules 41, 42, 43 and multipliers 44a–c that take the product of the output of these three modules. This utilizes the mathematical fact that the fourteenth power of any element of the subfield, GF(16), is the inverse of that element. Thus, the subfield-power integrated divider circuit 40 utilizes power-inversion techniques, but only for one nybble which is an intermediate result of the calculation, not for any byte as a whole: in this respect, it differs from the standard power-inversion technique presented in FIG., 4.

Furthermore, as shown in FIG. 6, the output of the squaring module 41 is not immediately multiplied by the outputs of the fourth power and eighth power modules 42, 43 as would be done if the multiplicative inverse were simply calculated. For comparison, FIG. 5 separates out the relevant part of the subfield-power integrated divider circuit 40. If the multiplier 44b immediately following the squaring module 41 were removed, one would then have a nybble inversion module. Rather, the output of the squaring module 41 multiplies the output of a module that did a preliminary multiply on the input dividend (ax+b), while, at the same time and in parallel, the outputs of the fourth and eighth power modules 42, 43 are multiplied together. The result is that the multiplicative inverse is not actually calculated. In effect, the dividend is multiplied by the multiplicative inverse of the divisor at a point in time at the beginning of the calculation of the multiplicative inverse of the divider circuit 40. In this manner, the process of multiplicative inversion and multiplication are intimately integrated so that the multiplication, in effect, costs no time at all. To carry out a full division takes exactly the same amount of time with this technique as simply to carry out a multiplicative inversion.

Figure 7:
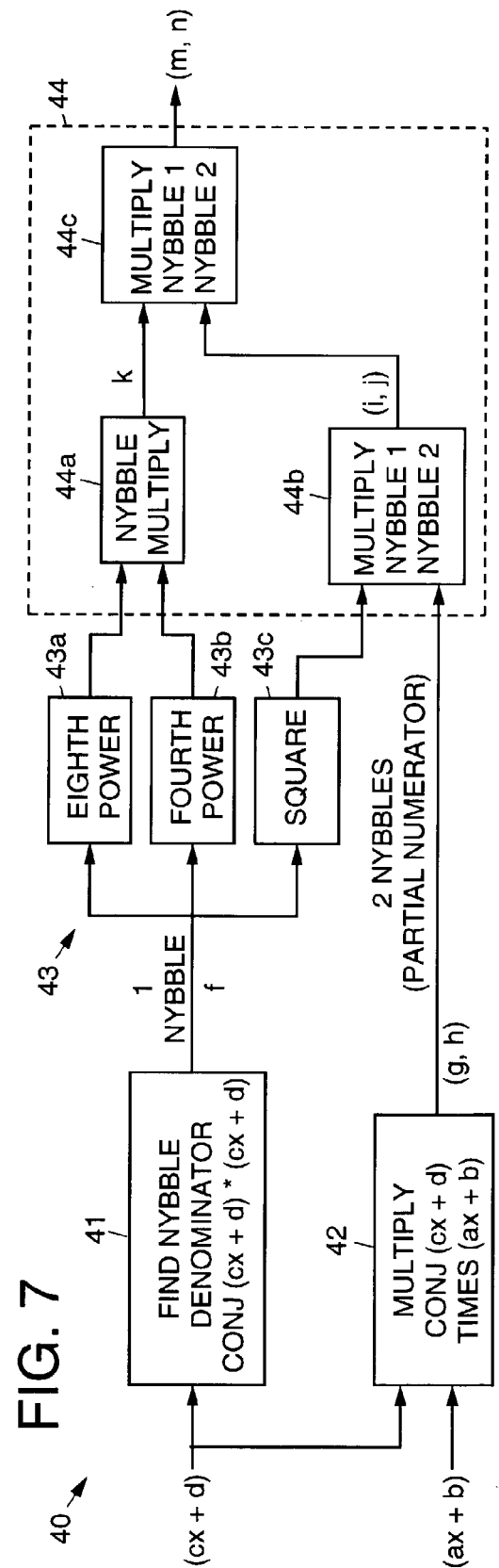
FIG. 7 is a block diagram of the present Galois-field divider circuit including the circuitry shown in FIGS. 5 and 6.

FIG. 7 is a block diagram of the present Galois-field divider circuit 40 that combines the circuitry shown in FIGS. 5 and 6. Inputs to the square, fourth power, and eighth power modules 44a, 44b, 44c are derived from a module 41 that computes a nybble denominator [conjugate (cx+d)*(cx+d)] having (cx+d) as an input. A partial numerator given by [conjugate (cx+d)*(ax+b)] is computed by a multiplier module 42 having (ax+b) and (cx+d) as inputs. The multiplier module 42 multiplies the conjugate of (cx+d) times (ax+b) to produce two nybbles that are input to the multiplier 44b immediately following the squaring module 41.

Thus, a modular Galois-field subfield integrated inverter-multiplier circuit that is implemented in the form of an integrated circuit and that may be used to implement Galois-field division over GF(245) has been disclosed. It is to be understood that the described embodiment is merely illustrative of some of the many specific embodiments that represent applications of the principles of the present invention. Clearly, numerous and other arrangements can be readily devised by those skilled in the art without departing from the scope of the invention.

What is claimed is:

1. A modular Galois-field subfield integrated inverter-multiplier circuit that performs a Galois-field division operation, comprising:

a nybble denominator circuit that computes a nybble denominator;

a conjugate multiplier circuit that computes a nybble numerator;

a nybble inversion circuit that performs power inversion to invert the nybble denominator; and a multiplier circuit that multiplies the inverse of the nybble denominator by the nybble numerator to complete the Galois-field division operation.

2. The inverter-multiplier circuit of claim 1 which performs Galois-field division over GF(245).

3. The inverter-multiplier circuit of claim 1 wherein the internal Galois-field representation comprises a quadratic subfield representation.

4. The inverter-multiplier circuit of claim 1 wherein the conjugate multiplier circuit processes subfields of the Galois-field to compute the nybble numerator.

5. The inverter-multiplier circuit of claim 1 wherein the multiplication and inversion computations are carried out simultaneously in parallel.

6. A modular Galois-field subfield integrated inverter-multiplier circuit that performs a Galois-field division operation, comprising:
   a nybble denominator circuit that computes a nybble denominator;
   a conjugate multiplier circuit that computes a nybble numerator;
   a nybble inversion circuit that performs subfield and power inversion to invert the nybble denominator; and
   a multiplier circuit that multiplies the inverse of the nybble denominator by the nybble numerator to complete the Galois-field division operation.

7. The inverter-multiplier circuit of claim 6 which performs Galois-field division over GF(245).

8. The inverter-multiplier circuit of claim 6 wherein the internal Galois-field representation comprises a quadratic subfield representation.

9. The inverter-multiplier circuit of claim 6 wherein the conjugate multiplier circuit processes subfields of the Galois-field to compute the nybble numerator.

10. A modular Galois-field subfield integrated inverter-multiplier circuit that performs a Galois-field division operation, comprising:
    a nybble denominator circuit that computes a nybble denominator;
    a conjugate multiplier circuit that computes a nybble numerator;
    a nybble inversion circuit that performs subfield and power inversion to invert the nybble denominator; and
    a multiplier circuit that multiplies the inverse of the nybble denominator by the nybble numerator to complete the Galois-field division operation; and
    wherein the multiplication and inversion computations are carried out simultaneously in parallel.

11. The inverter-multiplier circuit of claim 10 which performs Galois-field division over GF(245).

12. The inverter-multiplier circuit of claim 10 wherein the internal Galois-field representation comprises a quadratic subfield representation.

13. The inverter-multiplier circuit of claim 10 wherein the conjugate multiplier circuit processes subfields of the Galois-field to compute the nybble numerator.

* * * * *